United States Patent [19]

Kobashi et al.

[11] 4,237,256

[45] Dec. 2, 1980

[54] PROCESS FOR PRODUCING AN ACRYLONITRILE POLYMER MELT

[75] Inventors: Toshiyuki Kobashi; Masahiko Ozaki; Noboru Abe, all of Okayama, Japan

[73] Assignee: Japan Exlan Company Limited, Osaka, Japan

[21] Appl. No.: 927,910

[22] Filed: Jul. 25, 1978

[30] Foreign Application Priority Data

Aug. 11, 1977 [JP] Japan .................. 52-96801

[51] Int. Cl.³ .................. C08F 20/44; C08F 4/30; C08F 220/14
[52] U.S. Cl. .................. 526/229; 260/29.6 AN; 526/88; 526/329.3; 526/341
[58] Field of Search .................. 526/229, 341, 329.3, 526/88; 260/29.6 AN

[56] References Cited

U.S. PATENT DOCUMENTS

| 3,634,370 | 1/1972 | D'Alelio | 526/341 |
| 3,873,508 | 3/1975 | Turner | 526/86 |
| 4,049,605 | 9/1977 | Kobashi et al. | 526/329.3 |
| 4,062,857 | 12/1977 | Kobashi et al. | 526/330 |
| 4,080,494 | 3/1978 | Ozaki et al. | 526/229 |

*Primary Examiner*—Joseph L. Schofer
*Assistant Examiner*—Herbert J. Lilling
*Attorney, Agent, or Firm*—Wenderoth, Lind & Ponack

[57] ABSTRACT

In a process for producing an acrylonitrile polymer melt in a substantially melted state by polymerizing a monomer mixture containing acrylonitrile in the presence of water at elevated temperature under increased pressure, the polymerization is carried out continuously using a persulfate as the polymerization initiator and under a particular forced stirring as defined in the specification. This process effectively suppresses runaway polymerization reaction, facilitates the melting of the resulting polymer, and in addition produces in an industrially advantageous manner a melt of an acrylonitrile polymer having a moderate molecular weight.

7 Claims, No Drawings

PROCESS FOR PRODUCING AN ACRYLONITRILE POLYMER MELT

BACKGROUND OF THE INVENTION

1. Field of the Invention

The present invention relates to a process for the continuous production of an acrylonitrile polymer melt. More specifically, the invention is concerned with a process for producing an acrylonitrile polymer in a substantially melted state by polymerizing acrylonitrile alone or a monomer mixture containing acrylonitrile, in the presence of water, at elevated temperature under increased pressure, wherein the polymerization is carried out using a persulfate as the polymerization initiator and under a particular forced stirring as defined in the specification, with the result that a runaway polymerization reaction is effectively suppressed, the melting of the resulting polymer is facilitated, and in addition a melt of an acrylonitrile polymer having a moderate molecular weight and able to be dyed can be produced in an industrially advantageous manner.

2. Description of the Prior Art

In recent years, it has been revealed that, when an acrylonitrile polymer is treated at high temperature under increased pressure in the presence of a small amount of a non-solvent, the polymer and the non-solvent form a homogeneous fluid which represents a fluidity like that of the melt of polyesters or polyamides. As regards processes for producing fibers by spinning such a melt, several proposals have been made as seen in U.S. Pat. No. 3,388,202, Disclosed Japanese Patent Applications Nos. 28982/1973, 49839/1973, 52832/1973, etc. In particular, most of these processes use water as the non-solvent for acrylonitrile polymers, and it is a remarkable feature of such processes that acrylic synthetic fibers are obtained without using conventional expensive solvents such as dimethylformamide, dimethyl sulfoxide, aqueous thiocyanate solutions, concentrated nitric acid, etc.

By applying this melting phenomenon to a polymerization system, there has been proposed, as Disclosed Japanese Patent Application No. 97683/1975, a process for the production of an acrylonitrile polymer melt simultaneously with the polymerization of acrylonitrile, and since then the use of such acrylonitrile polymer melts in the production of fibers, etc. is receiving attention from the viewpoint of process contraction (simplification), cost reduction, material economy, prevention of environmental pollution, etc.

In all these processes, however, a high-temperature, pressurized conditions exceeding one hundred and several tons of degrees are employed to melt acrylonitrile polymers in the presence of water. Accordingly, these processes involve various problems awaiting solution in the quality of the resulting polymer and in industrial operations, including discoloration of the polymer, danger due to high-temperature operations, increased energy cost due to high-temperature maintenance, ensurance of safety, reduction in cost, etc.

Especially, in such a process as the above-mentioned patent in which an acrylonitrile polymer melt is produced simultaneously with the polymerization of acrylonitrile, monomer is present at high concentration in the polymerization system and the polymerization system becomes highly viscous, so that an abnormal temperature rises due to a runaway of the polymerization reaction and local accumulation of heat due to a drop in heat transfer are caused, by which the discoloration of the resulting melt becomes more remarkable. With the enlargement of the scale of the process, such a runaway of the polymerization reaction and accumulation of heat causes more and more knotty problems, not only aggravating the discoloration of the polymer but also widening the molecular weight distribution of the polymer, and moreover affording even a possibility of creating a dangerous condition of causing the explosion of the polymerization tank by extraordinary pressure elevation.

STATEMENT OF THE INVENTION

In the light of such a situation in the prior art, we attempted to solve these technical problems and have already disclosed in Japanese Patent Application No. 21582/1976 that hydrogen peroxide (aqueous catalyst) is suitable for the above-mentioned polymerization system. As a result of a further intensive study, we have found that, in the continuous production of an acrylonitrile polymer melt by continuous polymerization at elevated temperature under increased pressure, an integrated combination of the use of a persulfate as the polymerization initiator and the mixing of the polymerization system using a stirrer of a high mixing speed having a stirring ability as will be mentioned later, makes it possible to produce an acrylic polymer in a substantially melted state which is but little colored as a result of the easiness of polymerization temperature control. The present invention is based on this discovery.

A first object of the present invention is, therefore, to produce, continuously and stably, an acrylic polymer in a substantially melted state having a high degree of whiteness, without causing any runaway reaction.

A second object of the present invention is to provide a polymerization means which can facilitate the control of polymerization temperature and can give an acrylic polymer melt of good quality which causes no gellation phenomenon.

A third object of the present invention is to produce, by an energy-saving, highly productive and simple process, an acrylonitrile polymer least colored and very excellent in quality in high industrial efficiency which can be immediately supplied to shaping operations, such as spinning, film formation or extrusion (foaming) shaping.

A fourth object of the present invention is to provide a polymerization process in which the recovered monomer product is not contaminated with the decomposed product of the polymerization initiator (persulfate) used.

A fifth object of the present invention is to provide a polymerization process which makes the dyeing of the melt itself, that is to say, makes the so-called dope dyeing possible.

Other objects of the present invention will become apparent from the following concrete explanation of the invention.

The above-mentioned objects of the present invention are attained by a process of producing an acrylonitrile polymer in a substantially melted state by polymerizing acrylonitrile alone or a monomer mixture composed mainly of acrylonitrile and, as a further component, at least one other ethylenically unsaturated compound, in a system in which water is present in an amount in the range of from 3 to 50% by weight based on the total amount of monomer(s) and water, at a pressure which is at least autogeneous pressure and at a temperature above 120° C., in which process the polymerization is carried out continuously using a persulfate as the polymerization initiator and mixing the polymerization system by means of a stirrer having a stirring ability as defined later. By employing the polymerization technique using this polymerization initiator and the prescribed mixing technique, it has now become possible for the first time to produce, in an industrially advantageous manner, an acrylonitrile polymer melt remarkably improved in whiteness and dope-dyeability, while suppressing the runaway of the polymerization reaction.

The fact that persulfates can be advantageously used in the continuous polymerization of acrylonitrile at elevated temperature and pressure under a particular forced stirring, was not expected from the polymerization behavior of acrylonitrile in the conventional batchwise process (non-continuous process) using a persulfate in which only a cross-linked polymer (gelled polymer) is obtained at a low polymerization ratio as shown in the above-mentioned Japanese Patent Application No. 21582/1976, and it is also an important feature of the present invention that the polymerization temperature control has become easy by using a special polymerization initiator and mixing means, by which the discoloration of the melt is markedly suppressed, that is to say, an acrylonitrile polymer melt having very excellent whiteness can be obtained; and another important feature is that a cation-dyeable non-cross-linked polymer melt has been obtained continuously and at high yield.

As distinct from oil-soluble polymerization initiators like azo compounds and organic peroxides, in the case of persulfates (which are used in a continuous polymerization system, of course), the effectiveness of the initiator is most evident at 120°–160° C. (which is the suitable temperature range for obtaining a preferable acrylonitrile polymer melt). This temperature range can be easily maintained by the polymerization heat of the monomer itself, in other words, the polymerization temperature is easily self-controlled. Accordingly, no particular polymerization operation is required, and an abrupt polymerization reaction due to a polymerization temperature rise is difficult to occur. Therefore, an acrylonitrile polymer melt improved in quality can be stably obtained at high operability.

Since a persulfate can be used in mixture with water, it can be supplied to the polymerization system separately from the monomer solution. Accordingly, it is possible to prevent any polymerization reaction which otherwise may proceed in the monomer solution until it is supplied to the polymerization system. Also, it is possible to avoid any explosion in the supplying system (including tanks, pipes, etc.) caused by the runaway of the polymerization reaction in the monomer solution. Thus, all difficulties have been overcome which are encountered in the conventional process in which an oil-soluble polymerization initiator is dissolved in the monomer liquid and then supplied to the polymerization system.

Furthermore, since the decomposed products of the persulfate used in the present invention are non-volatile, as distinct from the case of the conventional azo compounds or organic peroxides, they do not pollute recovered monomer upon recovering unreacted monomer from the polymer melt. This is another feature of the present invention.

DESCRIPTION OF PREFERRED EMBODIMENTS

The high-temperature pressurized polymerization employed in the present invention is applicable to the polymerization of acrylonitrile only or a monomer mixture consisting mainly of acrylonitrile (preferably not less than about 75 weight percent) and as a further component, at least one other ethylenically unsaturated compound. Among said other ethylenically unsaturated compounds which are the copolymerization components, there may be mentioned well-known compounds copolymerizable with acrylonitrile, for example vinyl halides and vinylidene halides such as vinyl chloride, vinyl bromide, vinyl fluoride, vinylidene chloride, etc.; unsaturated carboxylic acids such as acrylic acid, methacrylic acid, maleic acid, itaconic acid, etc. and their salts; acrylic acid esters such as methyl acrylate, ethyl acrylate, butyl acrylate, octyl acrylate, methoxyethyl acrylate, phenyl acrylate, cyclohexyl acrylate, etc.; methacrylic acid esters such as methyl methacrylate, ethyl methacrylate, butyl methacrylate, octyl methacrylate, methoxy methacrylate, phenyl methacrylate, cyclohexyl methacrylate, etc.; unsaturated ketones such as methyl vinyl ketone, phenyl vinyl ketone, methyl isopropenyl ketone, etc.; vinyl esters such as vinyl formate, vinyl acetate, vinyl propionate, vinyl butyrate, vinyl benzoate, etc.; vinyl ethers such as methyl vinyl ether, ethyl vinyl ether, etc.; acrylamide and its alkyl-substituted compounds; unsaturated sulfonic acids such as vinylsulfonic acid, allylsulfonic acid, methallylsulfonic acid, p-styrenesulfonic acid, etc. and their salts; styrenes such as styrene, α-methylstyrene, chlorstyrene, etc. and their alkyl- or halogen-substituted compounds; allyl alcohol and its esters and ethers; basic vinyl compounds such as vinylpyridine, vinylimidazole, dimethylaminoethyl methacrylate, etc.; unsaturated aldehydes such as acrolein, metacrolein, etc.; unsaturated nitriles such as methacrylonitrile, vinylidene cyanide, etc.; and cross-linkable vinyl compounds such as glycidyl methacrylate, N-methylolacrylamide, hydroxyethyl methacrylate, divinylbenzene, ethylene glycol diacrylate, etc.

In the polymerization process according to the present invention using such monomers, water is made present in an amount in the range of from 3 to 50% by weight, preferably 5 to 30% by weight, based on the total weight of monomer(s) and water which form the polymerization system. Also, it is necessary that the polymerization system should be maintained under a pressure which is at least autogeneous pressure, namely under a pressure above the vapor pressure generated in the polymerization system under the polymerization conditions. Besides, it is necessary to employ as the polymerization temperature a temperature above 120° C., preferably above 130° C. The upper limit of the polymerization temperature is below 160° C., preferably below 150° C. In case the polymerization temperature exceeds this limit, problems are caused such as lowering of polymerization conversion, discoloration of the melt, etc. By satisfying such polymerization conditions, a flowable, transparent acrylonitrile polymer melt suitable for spinning, melt (foaming) shaping, etc. can be obtained, and the employment of the polymerization conditions outside these ranges makes difficult to attain the objects and effects of the present invention.

The polymerization according to the present invention is carried out in a closed system or in a polymerization apparatus equipped with a suitable pressurizing means to maintain a pressure above the vapor pressure generated in the polymerization system under the polymerization conditions (autogeneous pressure), generally between about 2 and about 3 atmospheres, or above. For the polymerization pressure, any pressure may be used which is above the above-mentioned vapor pressure (autogeneous pressure). For example, under a high pressure above 100 atmospheres, or even above 1000 atmospheres, the polymerization operation according to the present invention can be carried out. However, it is suitable to polymerize generally under a pressure between about 3 atmospheres and about 100 atmospheres, in view of the ease of industrial operation and for the facility of removing the resulting polymer melt from the polymerization system.

As regards the polymerization reaction employing the above-mentioned polymerization conditions such as temperature and pressure, the reaction must be carried out continuously. In case the reaction is carried out on a batchwise basis, even if a water-soluble catalyst is employed, not only is polymer gellation liable to occur and cause remarkable inconvenience in spinning, melt shaping, etc., but in addition, the polymerization conversion is low, the reproducibility of polymerization results is poor and only a non-homogeneous melt is obtained. These are considered to be caused by the abrupt progress of polymerization reaction in its early stage, which brings about side-reactions such as local accumulation of heat, discoloration, gellation, and non-uniformity of the melt.

Under such continuous polymerization conditions, a polymerization initiator composed of a persulfate is used as the polymerization initiating means in the present invention. The persulfate is supplied to the polymerization system as an aqueous solution separately from the monomer solution. As regards the aqueous persulfate solution used in the present invention, solutions of various concentrations (within the range of its solubility) are used depending on the polymerization conditions. The persulfates used in the present invention are selected from ammonium salts such as ammonium persulfate and alkali metal salts such as potassium persulfate. The amount of persulfate used as the polymerization initiator is generally 0.1–5% by weight, preferably 0.3–3% by weight, based on the monomer used.

The molecular weight regulation of the polymer formed in the present invention is attained by varying the amount persulfates used, and also by the presence in the polymerization system, of a well-known chain transfer agent, such as amines, alcohols, substituted benzenes, chloroform, mercapto compounds, ketones, etc. By using a persulfate as the polymerization initiator according to the present invention, the phenomenon of excessively accelerated polymerization speed (the runaway of the polymerization speed) is suppressed effectively, so that there is no necessity of adding any polymerization retarder to the continuous polymerization system. However, there are cases wherein the addition of a polymerization retarder is desirable, for example when the stirring in the continuous polymerization tank is insufficient or when the heat transfer efficiency is poor.

For the purpose of regulating the molecular weight of the resulting polymer and for controlling the polymerization speed, a reducing agent may be added to the polymerization system. Such reducing agents include reducing sulfoxy compounds such as Rongalit, sulfurous acid, sulfites, hydrosulfites, bisulfites, metabisulfites, thiosulfates, etc.; amines such as monoethanolamine, triethanolamine, etc.; disodium phosphite; reducing organic acids such as tartaric acid, 1-ascorbic acid, etc. Also, it does not depart from the scope of the present invention to add a slight amount (less than 100 ppm based on the monomer used) of metal ions ($Al^{+++}$, $Cu^{++}$, $Ag^+$, $Fe^{++}$, $Fe^{+++}$, $Ni^{++}$, $Co^{++}$, etc.) to the polymerization system.

As a method of regulating the polymerization speed and molecular weight in the present invention, it is very effective to vary the pH of the aqueous phase to be supplied to the continuous polymerization system. The pH of the aqueous phase employed is generally within the range of from 1.0 to 10, preferably from 1.5 to 9. In such a pH range, the polymerization speed is fast in the low pH region (this gives a larger molecular weight) and slow in the high pH region (this gives a smaller molecular weight). Since the degree of color of the resulting polymer is considerably influenced by the pH of the aqueous phase to be supplied to the polymerization system, it is desirable to employ a pH between 2 and 8 in order to obtain a polymer having excellent whiteness.

It is also permissible to add to the polymerization system, additives for improving the properties of the resulting polymer, for example anti-discoloration agents, stabilizers against heat, flame retardants, antistatics, stabilizers against ultraviolet ray, pigments, etc. in an amount within the range in which they do not adversely affect the polymerization according to the present invention.

The polymerization time (the average residence time of the substance to be polymerized in the polymerization tank) in the process of the present invention is varied depending on the amount of use of the polymerization initiator, monomer concentration, polymerization pH, polymerization temperature, mixing conditions, etc. but a duration of generally from 5 minutes to 2 hours, preferably from 10 minutes to one hour is employed. Thus, it can be enumerated as one of the advantages of the present invention that the continuous polymerization can be accomplished within a short time. The polymerization reaction according to the present invention is most suitable for the continuous process of a forced stirring system, but is not suitable for the above-mentioned batchwise method (stationary polymerization method) or a tube-type continuous polymerization process (not under forced stirring as in the present invention).

In addition to the employment of such polymerization conditions, it is necessary for the present invention to stir the polymerization system at a mixing speed which will be mentioned later. In order to stir and mix the system of continuous polymerization, a stirrer with high mixing speed is used which has a mixing ability as defined in the following:

One hundred weight parts of a homogeneous blue colored solution having a viscosity of 3000 centipoises is prepared by adding an aqueous solution of potassium iodide (260 g $I_2$/1 $H_2O$) to a hydrolyzed starch syrup solution. To this blue colored solution is added, 10 weight parts of an aqueous solution containing sodium thiosulfate ($Na_2S_2O_3$) corresponding to 1.4 times the iodine equivalents present in said blue colored solution, and the mixture is stirred. When the time interval from the moment of addition until the blue color disappears is less than 60 seconds, such a stirrer is defined as having a high mixing ability. Such stirrers include stirrers for high viscosity solutions with stirring vanes of, for example, anchor type, gate type, helical screw type, helical ribbon type, etc. Of course, as previously mentioned, even in the case of continuous polymerization if the stirring is weak (for example as in the case of tube type continuous polymerization), the gellation of polymer will occur, making it difficult to obtain a homogeneous polymer melt. We have not yet succeeded in finding a clear and accurate theoretical explanation as to why a homogeneous polymer melt with high degree of whiteness can be obtained without gellation, if continuous polymerization is carried out at such a mixing speed and in the presence of a persulfate. However, it is supposed that, when an amount of monomer in a well mixed state is continuously supplied to the polymerization system, that is to say, when monomer supply to the polymerization place does not cease, the polymerization reaction caused by radicals produced from the persulfate which is the polymerization initiator, proceeds prior to the hydrogen abstraction from the polymer. (In the case where such hydrogen abstraction occurs preferentially, branching and cross-linkage are formed in the polymer structure and the resulting polymer will form a gel.).

The polymer melt according to the present invention has a sulfate group (acid group) introduced to the terminal of the polymer molecule, because of the use of the initiator (persulfate). Sulfate groups are useful for ionic dyeing with cationic dyes. When a desired cationic dye is added to the polymer melt, cationic dyeing of the polymer melt (dope dyeing) is accomplished before spinning on account of ionic bonding of the molecular terminal group (acid group) with the cationic dye. We believe that the attainment of the dope dyeing of the polymer melt under elevated temperature and pressure will surely widen the applications of this pressurized homogeneous polymerization technique. It goes without saying that fibers, films, foamed shaped products, etc. produced from the polymer obtained using the polymerization initiator according to the present invention can be dyed by post-dyeing, without relying on dope dyeing.

In order to introduce, as dope dyeing means, ionizing groups (sulfonic acid groups, carboxylic acid groups or quaternary amines), it is known to copolymerize methacrylic acid, acrylic acid, methallylsulfonic acid, 2-methyl-5-vinylpyridine, etc. But since most of these monomers are non-volatile (or of high boiling point) or water-soluble, difficulties are frequently encountered in the recovery of these monomers. Also, cases are often encountered wherein these monomers are poor in alternate copolymerizability or induce a low polymerization conversion or a low molecular weight. Therefore, the use of these monomers is not advisable from the technical and economical viewpoint.

The acrylonitrile polymer produced by the continuous polymerization according to the present invention, which is clear and in a substantially melted state and does not gel, can be supplied for spinning, film formation, foamed product shaping, etc., as it stands or after separating the polymer melt phase from the water phase. Also, the polymer melt, after a solvent for acrylonitrile polymers (for example an aqueous solution of an inorganic salt such as zinc chloride, a thiocyanate, etc. or an inorganic solvent such as nitric acid; or an organic solvent such as dimethylformamide, dimethyl- acetamide, dimethyl sulfoxide, γ-butyrolactone, ethylene carbonate, etc.) has been introduced thereinto under pressure and mixed therewith, may be produced into fibers in the usual way by wet-spinning or dry-spinning or shaped into films or shaped products. Because a value within the range of from about 55% to 97% is employed as the practical polymerization ratio in the present invention, unreacted monomer remains in the resulting polymer melt. Such unreacted monomer is recovered by some suitable means in the course of spinning, film formation, or shaping, or after cooling the polymerization product, and the recovered monomer can be reused. The merit of this recovery is that decomposed products of persulfate do not come into the recovered monomer. In contrast, in the case of an oil-soluble initiator, there is a disadvantage in that decomposed products remain in the recovered product.

By the process of the present invention, the polymerization step can be extremely simplified, and at the same time the amount of water and heat energy employed can be markedly reduced. Furthermore, shaped products or dyed shaped products can be obtained without using any solvent, and thus the process has an advantage in that the recovery of solvent and the problem of its high-degree of purification can be avoided. In a continuous polymerization at high temperature under increased pressure as in the present invention, the polymerization is carried out in the melted state and therefore the transport (transfer) of the polymer is relatively easy in comparison with the case of mass polymerization. However, because of a high monomer concentration in the polymerization system, the system is in a condition such that a runaway reaction is liable to take place, and in addition there is a problem of the discoloration of the resulting polymer due to the employment of high temperature conditions. However, the complete solution of these problems by the use of the specific polymerization initiator and the employment of the particular mixing means according to the present invention, markedly heightens the industrial importance of the present invention.

The present invention will be explained in further detail by way of examples, but the invention is not limited in scope by these examples. In the examples, parts and percentages are by weight unless otherwise specified. The APHA numbers (American Public Health Association numbers) mentioned in the examples are values calculated by the APHA standard curve, of the degree of absorbance for a transmitted light of 430 μm through a sample solution of 0.4 g polymer in 20 ml dimethylformamide. The greater this value, the greater is the degree of discoloration.

COMPARATIVE EXAMPLE

A monomer mixture consisting of 90% acrylonitrile and 10% methyl acrylate was prepared. 0.8 part of the monomer mixture was put into a Pyrex glass tube, 5 mm in inner diameter and 150 mm in length, with the lower end closed. Then, 1.5% ammonium persulfate based on the monomers and 0.2 part of water at each pH value shown in Table 1 (prepared with an aqueous solution of NaOH or HCl) were added. After the air in the vacant portion of each glass tube was replaced with nitrogen gas, the upper end of the tube was closed by fusion. Each glass tube containing the polymerization reactants was allowed to stand in an oil bath at 150° C. for 30 minutes to carry out batchwise polymerization, and a polymer melt was obtained. The results are shown in Table 1.

Table 1

| Sample no. | Amount of the initiator added, %, based on monomer | pH of the water phase | Solubility of polymer in DMF* |
|---|---|---|---|
| 1 | 1.5 | 1.5 | Insoluble |
| 2 | 1.5 | 2.3 | Insoluble |
| 3 | 1.5 | 7.1 | Insoluble |
| 4 | 1.5 | 7.7 | Insoluble |
| 5 | 1.5 | 8.7 | Insoluble |
| 6 | 1.5 | 10.1 | Insoluble |
| 7 | 1.5 | 11.5 | Insoluble |

*Solubility in dimethylformamide at 60° C. in one hour

It is seen from Table 1 that, despite the use of ammonium persulfate as the polymerization initiator, in the case of batchwise polymerization all experiments produced a cross-linked polymer.

EXAMPLE 1

Continuous polymerization of acrylonitrile was carried out using a polymerization tank, 740 ml of capacity, equipped with anchor-shaped stirring vanes, a temperature detecting tube, a pressure detecting tube, and a jacket. The polymerization tank had a stainless steel feed pipe attached to its bottom. The feed pipe was connected to a plurality of plunger pumps. On the side wall of the tank, a needle valve was attached. The jacket of the polymerization tank was provided with a pipe to flow steam or compressed air. The jacket was also equipped with detecting tubes for detecting temperature and pressure of the melt in the polymerization tank. The stirring vanes were designed so that a desired number of rotation or mixing speed can be obtained by a stepless ring cone.

Upon starting the polymerization, first the needle valve was closed completely, and then the pumps were started to introduce the following monomer mixture and aqueous solution (containing ammonium persulfate) into the polymerization tank maintained at 135° C., from feed pipe, and continuous polymerization was caused to proceed under the following conditions.
Monomer composition: Acrylonitrile/methyl acrylate=91/9
Ratio of monomer/aqueous solution: 78/22
Composition of the aqueous solution: Ammonium persulfate, 2.5% based on monomer
Chain transfer agent: Thioglycol, 0.05% based on monomer
Average residence time in the tank: 30 minutes Polymerization temperature: 135° C.
Mixing speed: Described in Table 2

When the polymerization tank was filled with the polymer in a melted state, the aperture of the needle valve was regulated so as to maintain the pressure in the tank at 30 kg/cm² (gauge pressure). With the pressure maintained under this condition, the melt in the polymerization tank was extruded continuously into an atmospheric pressure zone through the needle valve. The results of the polymerization are shown in Table 2.

Table 2

| Sample no. | Mixing speed as previously defined (seconds) | Polymerization conversion | Molecular weight | Solubility* |
|---|---|---|---|---|
| 8 | 90 | Measurement impossible | Polymer gelled | Insoluble |
| 9 | 75 | Measurement impossible | Polymer gelled | Insoluble |
| 10 | 55 | 43.6 | 40,000–70,000 | Soluble |
| 11 | 50 | 67.9 | 54,600 | Soluble |
| 12 | 43 | 66.9 | 57,700 | Soluble |
| 13 | 20 | 73.6 | 56,400 | Soluble |

Solubility in dimethylformamide at 60° C. in one hour

It is clearly understood from Table 2 that, when the use of ammonium persulfate as the polymerization initiator, maintenance of the polymerization system in the prescribed mixing condition, and polymerization on a continuous basis are integrally combined, a transparent non-cross-linked polymer melt in a substantially melted state can be produced in high yield.

EXAMPLE 2

An aqueous solution containing a monomer mixture of acrylonitrile and methyl acrylate, ammonium persulfate and an additive (foaming agent) was supplied into a polymerization tank at the ratio shown in Table 3 and continuous polymerization was carried out under the following polymerization condition and using the polymerization operation as in Example 1.
Polymerization condition:
Residence time 50 minutes
Polymerization temperature 135° C.
Stirring speed 30 seconds In every case, a polymer melt of excellent whiteness was obtained continuously and stably.

Table 3

| Sample no. | Polymerization condition ||||| Polymer melt |||  Amount of —OS₃H introduced to polymer molecular terminal, % based on polymer |
| | Composition of monomer mixture Acrylonitrile/methyl acrylate | Amount of initiator, % based on monomer | Monomer/water | Amount of additive, % based on monomer | Polymerization conversion, % | Molecular weight | APHA number | |
|---|---|---|---|---|---|---|---|---|
| 14 | 91/9 | 1.0 | 70/30 | — | 79.9 | 68,100 | 680 | 0.41 |
| 15 | 91/9 | 1.0 | 75/25 | n-heptane 1.0 | 74.2 | 66,800 | 520 | 0.37 |
| 16 | 91/9 | 1.0 | 78/22 | n-heptane 1.0 | 77.0 | 72,500 | 500 | 0.40 |
| 17 | 88/12 | 2.0 | 80/20 | sodium bicarbonate 0.8 | 73.1 | 59,900 | 810 | 0.55 |
| 18 | 91/9 | 2.0 | 85/15 | — | 65.7 | 67,400 | 730 | 0.42 |

Upon producing acrylic fibers from the polymer melts of Sample Nos. 14 and 18, highly white and cation-dyeable fibers were obtained. In the case of Sample Nos. 15, 16 and 17 (containing a foaming agent), cation-dyeable synthetic rush-like structures were continuously obtained.

As a comparative example, a melt was produced in the same way as in the production of Sample No. 18, except that di-tert-butyl peroxide (organic peroxide) was used in place of ammonium persulfate. The results were not satisfactory, the melt having a polymerization conversion of 52.5%, a molecular weight of 49,800, and an APHA number above 1000. In addition, decomposed products (t-butyl alcohol, etc.) of the initiator came into the recovered monomer, and therefore upon reusing the recovered product in the polymerization reaction, the operability was remarkably lowered.

What we claim is:

1. In a process for producing an acrylonitrile polymer melt in a substantially clear, ungelled and melted state by polymerizing acrylonitrile alone or a monomer mixture composed mainly of acrylonitrile and, as a further component, at least one other ethylenically unsaturated compound, in a system in which water is present in an amount in the range of from 3 to 50% by weight based on the total amount of the monomer(s) and water, at a temperature above 120° C. and under a pressure which is at least autogeneous pressure, the improvement which comprises using a persulfate as the polymerization initiator, and carrying out the polymerization continuously, while subjecting the polymerization system to sufficient stirring to prevent gelation and coloration.

2. The process as claimed in claim 1 wherein the polymerization is carried out in a system in which water is present in an amount in the range of from 5 to 30% by weight based on the total amount of the monomer(s) and water.

3. The process as claimed in claim 1 wherein the polymerization temperature is from 130° C. to 150° C.

4. The process as claimed in claim 1 wherein the amount of use of the persulfate is 0.1 to 5% by weight based on the amount of the monomer(s).

5. The process as claimed in claim 1 or 4 wherein the amount of use of the persulfate is 0.3 to 3% by weight based on the amount of the monomer(s).

6. The process as claimed in claim 1 wherein the pH of the polymerization system is adjusted to between 2 and 8.

7. The method according to claim 1 wherein the agitation is such that when to 100 parts by weight of a homogeneous blue solution having a viscosity of 3000 centipoises, which solution is prepared by adding an aqueous solution containing potassium iodide with a concentration of 260 g. $I_2$ per liter $H_2O$ to a hydrolyzed starch syrup solution, there is added 10 parts by weight of an aqueous solution containing sodium thiosulfate in an amount corresponding to 1.4 times the equivalents of $I_2$ present in said blue solution, and the mixture is stirred, the time from the moment of addition until the blue color disappears is less than 60 seconds.

* * * * *